(12) United States Patent
Fletcher et al.

(10) Patent No.: US 6,321,264 B1
(45) Date of Patent: Nov. 20, 2001

(54) NETWORK-PERFORMANCE STATISTICS USING END-NODE COMPUTER SYSTEMS

(75) Inventors: Richard A. Fletcher, San Jose; Prakash C. Banthia, Santa Clara, both of CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/141,968

(22) Filed: Aug. 28, 1998

(51) Int. Cl.$^7$ .................................................. G06F 13/00
(52) U.S. Cl. ............................................ 709/224; 370/252
(58) Field of Search .................................... 709/200, 203, 709/217, 218, 219, 224, 227; 370/233, 238, 252, 253

(56) References Cited

U.S. PATENT DOCUMENTS

| | | | |
|---|---|---|---|
| 5,255,182 | * 10/1993 | Adams | 705/17 |
| 5,623,483 | * 4/1997 | Agrawal et al. | 370/253 |
| 5,757,772 | * 5/1998 | Thornberg | 370/236 |
| 5,809,540 | * 9/1998 | Malek et al. | 711/154 |
| 5,822,301 | * 10/1998 | Arnold et al. | 370/238 |
| 5,915,098 | * 6/1999 | Palmer et al. | 709/247 |
| 6,052,363 | * 4/2000 | Koch | 370/252 |
| 6,097,700 | * 8/2000 | Thornberg et al. | 370/233 |
| 6,134,531 | * 10/2000 | Trewitt et al. | 705/10 |
| 6,151,020 | * 11/2000 | Palmer et al. | 345/329 |

* cited by examiner

*Primary Examiner*—Moustafa M. Meky
(74) *Attorney, Agent, or Firm*—Wagner, Murabito & Hao LLP

(57) ABSTRACT

A method for quantifying communication performance in a communication network comprising computer systems communicatively coupled to each other with communication equipment. In one embodiment, the present invention measures performance statistics associated with data packets sent and received by the computer systems. First, this embodiment applies a first time-stamp to data packets sent by a computer system over the communication equipment, and applies a second time-stamp to data packets received by the computer system over the communication equipment. Second, in this embodiment the present invention correlates a first data packet sent by a first computer system over the communication network to a second data packet sent by a second computer system over the communication network. Third, in this embodiment the present invention computes a difference between a first time-stamp of the first data packet and a second time-stamp of the second data packet. Next, this embodiment calculates performance statistics measured on the difference and stores the performance statistics in a memory unit within the first computer system. Finally, in this embodiment the first computer system reports the stored performance statistics to a central computer system.

21 Claims, 8 Drawing Sheets

NETWORK-PERFORMANCE STATISTICS USING END-NODE COMPUTER SYSTEMS

TECHNICAL FIELD

The present invention relates to the field of computer system communication networks. In particular, the present invention pertains to network monitoring and management.

BACKGROUND ART

Computer systems linked to each other in a communication network are commonly used in businesses and like organizations. Computer system communication networks ("networks") are growing in size—as measured by the number of applications and the number of users they support—due to improvements in network reliability and the recognition of associated benefits such as increased productivity.

As the size of networks increases and as organizations become more reliant on such networks, the importance of effective network management tools also grows. In response to the need for standardization of such tools, primarily to control costs but also because components in a network are likely to originate from many different vendors, the Simple Network Management Protocol (SNMP) was developed and widely adopted. A number of management information bases (MIBs) have been defined since adoption of SNMP, such as MIB-II, Remote Network Monitoring (RMON) and later RMON2. RMON and RMON2 provide the capability for remote network monitoring; that is, a network manager is able to monitor network performance from a central computer system that has access to other components on the network, referred to as RMON probes, that monitor local areas of the network.

SNMP, RMON and RMON2 thus are network management software tools that provide a set of standards for network management and control, including a standard protocol, a specification for database structure, and a set of data objects. RMON and RMON2 are implemented in a network through management information bases (MIBs) which contain instructions specifying the data that are to be collected, how the data are to be identified, and other information pertinent to the purpose of network monitoring. The MIBs are implemented through the RMON probes to monitor the local areas of the network.

Network managers use the RMON and RMON2 MIBs using SNMP to collect information regarding the performance of the network. By collecting information about network performance and analyzing it, the network manager is able to recognize situations indicating that either a problem is present or impending.

For example, the network manager (or any of the network users, for that matter) may be interested in obtaining performance statistics such as the average and worst-case performance times and the reliability of the network for a particular application. Such applications generally describe a transaction between a user that is accessing the network through a client computer system and a server computer system that responds to the client computer system with the requested information. Network. managers need performance statistics to help them manage and maintain the network and to plan for network improvements. For example, performance statistics can be used to recognize bottlenecks in the network before they cause problems so that corrective action can be taken. If the performance statistics indicate a growing load in one area of the network, network traffic (in the form of data packets that travel through the network's communication equipment) can be routed along a different path. Statistics accumulated over a longer period of time can be used to help decide inwhether it is necessary to expand particular areas of the network.

Performance statistics are also necessary for businesses and the like to determine whether the network support provided by a vendor of network management services is satisfactory or not. Many businesses contract with vendors for network management services. Such contracts are typically implemented with service level agreements (SLAs) which specify metrics against which the provider of the network management services is measured. These metrics are used to quantify standards of performance that allow businesses to assess not only the performance of the network but also the performance of the network management services provider. SLAs generally include a provision specifying metrics for performance time for critical applications, where performance time, for example, is considered to be the amount of time between the time a user submits a request via the network and the time until the response to that request is received by the user. An effective network management tool should therefore provide a means for monitoring the network and gathering performance statistics for comparison against the requirements contained in the SLAs. However, as will be seen in the discussion below, the network management tools in the prior art do not provide a ready means of demonstrating compliance with SLAs.

Prior art network management tools have trouble aiding the network manager in determining whether a problem within the network is associated with the network or with the system hardware supporting the network, so that the network manager can identify and implement the appropriate corrective action. For example, if a user places a request for a particular application to a server computer and a response is not received, the prior art network management tools do not. generally identify whether the problem is occurring because of a bottleneck in the network or because the server is not functioning. Therefore, as will be seen in the discussion to follow, the network management tools in the prior art do not provide a ready means of monitoring performance of the entire network so that problems can be quickly detected.

With reference to FIG. 1, a prior art method used for network monitoring is illustrated for a simplified network 100. Network 100 is typically comprised of a plurality of client computer systems 110*a*, 110*b* and 110*c* networked with a number of different servers 130*a*, 130*b* and 130*c*. For this discussion, the focus is on client computer system 110*c* connected via communication lines 120 and 122 to server computer system 130*c*. Data packets (not shown) from client computer system 110*c* travel to server computer system 130*c* and back on either of communication lines 120 and 122, depending on the amount of traffic present on those lines due to simultaneous communications between client computer systems 110*a* and 110*b* and server computer systems 130*a*, 130*b* and 130*c*. The request data packets issued from client computer system 110*c* contain data that specify the address of client computer system 110*c* and the address of destination server computer system 130*c*, as well as other data pertinent to the application being used, such as data defining the request being made. The response data packets issued from server computer system 130*c* also contain the sender and destination address as well as other data needed to respond to the request.

With reference still to FIG. 1, coupled into communication lines 120 and 122 are other communications equipment such as switches 124 and 125 and routers 126 and 127. Also on communication lines 120 and 122 are RMON probes 140 and 142 (the term "RMON" refers to both RMON and RMON2). An RMON probe typically operates in a promiscuous mode, observing every data packet that passes only through the communication line to which it is coupled.

RMON MIBs provide the capability to define filters that can be used to limit the number of data packets observed by an RMON probe that are to be captured or counted. Filters are specified based on the type of data packet or other packet characteristics associated with the data contained within the data packet. Filters permit the RMON probe to screen observed data packets on the basis of recognition characteristics specified by the filter. Data packets are captured or counted by the RMON probe on the basis of a match (or a failure to match) with the specified recognition characteristics. Filters can be combined using logical "and" and "or" operations to define a more complex filter to be applied to data packets, thus focusing the screen onto a narrower group of data packets. Data packets that pass through the complex filter are selected for capture or counting and are referred to as a channel.

Packet monitoring using probes (as shown in FIG. 1) is problematic when data switching is used in network 100. Assume a user issues a request data packet (not shown) from client computer system 110c that is routed through communications line 120 to server computer system 130c. RMON probe 140 observes the request data packet and in this case, because of the filter specified, captures and counts the data packet. Server computer system 130c responds to the request data packet and transmits a response data packet (not shown). However, because of increased traffic on communications line 120, the response data packet is more efficiently routed back to client computer system 110c through communications line 122 and is observed by RMON probe 142. Because of the filter specified, RMON probe 142 also captures and counts the data packet.

In the prior art the RMON probes are only capable of making a count of the number of filtered data packets, which provides only a limited measure of the performance of the network. Thus, one drawback to the prior art is that, because of the nature of switched networks, a data packet may take one route from a client computer system to a server computer system and a different route back. Therefore, the packets are never correlated because they are counted by two different probes and each probe operates independently.

For example, the network manager would expect that the number of filtered response data packets and filtered request data packets would be equal, and if not, this would provide an indication of a potential problem on the network. However, this information only indicates the reliability of the network for carrying data packets, or the reliability of a server computer system to respond to a request, but does not provide a measure of the time it took to respond to the request. Therefore, another drawback to the prior art is that it does not measure performance times such as application response time, application processing time, or network latency, because packets might not be correlated if they are captured by different probes. Thus, in the prior art the network manager or a user does not have the desired information regarding the average and worst-case performance times. Hence, another drawback to the prior art is that the network services provider cannot readily demonstrate compliance to the governing SLA.

With reference again to FIG. 1, it is possible that, after the response data packet passes RMON probe 142 and is counted by RMON probe 142, a fault on communications line 122 may occur so that the response data packet is not delivered to client computer system 110c. For example, a failure of switch 125 may occur so that the response data packet is not able to complete its journey. However, in the prior art the response data packet may still be counted as a successful transaction. Thus, a disadvantage to the prior art is that a fault in the network may not be detected by the network monitoring software, and would only be eventually noticed by the user who did not receive a response to his/her request. Another drawback to the prior art is therefore that a fault in the network may not be noticed in a timely manner. An additional drawback to the prior art is that the accuracy of the performance statistics may be affected by the location of the RMON probes.

One prior art system attempts to address some of the disadvantages identified above by incorporating RMON into routers or switches instead of a probe, and adding a plurality of these components to the network. However, a disadvantage to this prior art system is that the speed at which the component (e.g., a switch) performs its primary function is significantly slowed by the addition of the network monitoring function, because of the complexity of RMON MIBs and the application of multiple filters. In addition, another drawback to this prior art system is that the cost of the component such as a switch is substantially increased by the incorporation of the RMON facilities. This prior art system also does not address the other disadvantages identified above, such as the inability to measure performance times and demonstrate compliance with SLAs in a switched communication system.

Accordingly, a need exists for a method to monitor a computer system communication network that readily and quickly detects and identifies a degradation of the network. A need further exists for a method that accomplishes the above and enables the network manager to demonstrate compliance with the provisions of the governing SLA. A need yet exists for a method that accomplishes the above and also provides an accurate measure of the network performance as well as its reliability. Finally, a need exists for a method that accomplishes the above and is cost-effective and compatible with the SNMP protocol that is currently employed. The present invention solves these needs. These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a method to monitor a computer system communication network that readily and quickly detects and identifies a degradation of the network. The present invention also provides a method that accomplishes the above and enables the network manager to demonstrate compliance with the provisions of the governing service level agreement (SLA). The present invention further provides a method that accomplishes the above and also provides an accurate measure of the network performance as well as its reliability. Finally, the present invention provides a method that accomplishes the above and is cost-effective and compatible with the Simple Network Management Protocol that is currently employed in many communication networks.

The present invention described herein provides a method for quantifying communication performance in a communication network having computer systems communicatively coupled to each other with communication equipment.

Specifically, in one embodiment, the present invention is implemented on a client computer system and measures performance statistics associated with data packets sent and received by the computer systems. First, this embodiment applies a first time-stamp to data packets sent by a computer system over the communication equipment, and applies a second time-stamp to data packets received by the computer system over the communication equipment. Second, in this embodiment, the present invention correlates a first data packet sent by a first computer system over the communication network to a second data packet sent by a second computer system over the communication network. Third, in this embodiment, the present invention computes a difference between a time-stamp of the first data packet and a time-stamp of the second data packet. Next, this embodiment calculates performance statistics measured on the difference and stores the performance statistics in a memory unit within the first computer system. Finally, in this embodiment the first computer system reports the stored performance statistics to a central computer system.

In one embodiment, the present invention implements the method described above using a management information base extension to Remote Network Monitoring (RMON)-based computer software, in which the management information base extension is comprised of a response time control table, a response time correlation table, a response time data table, and a response time statistics database.

In one embodiment, the present invention provides the method described above and applies the time-stamp at the network interface cards of the computer systems. In another embodiment, the present invention provides the method described above and applies the time-stamp at the protocol stack of the computer systems.

BRIEF DESCRIPTION OF THE DRAWINGS

The accompanying drawings, which are incorporated in and form a part of this specification, illustrate embodiments of the invention and, together with the-description, serve to explain the principles of the invention.

BEST MODE FOR CARRYING OUT THE INVENTION

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these. specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system (e.g., processes of FIGS. 7 and 8), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
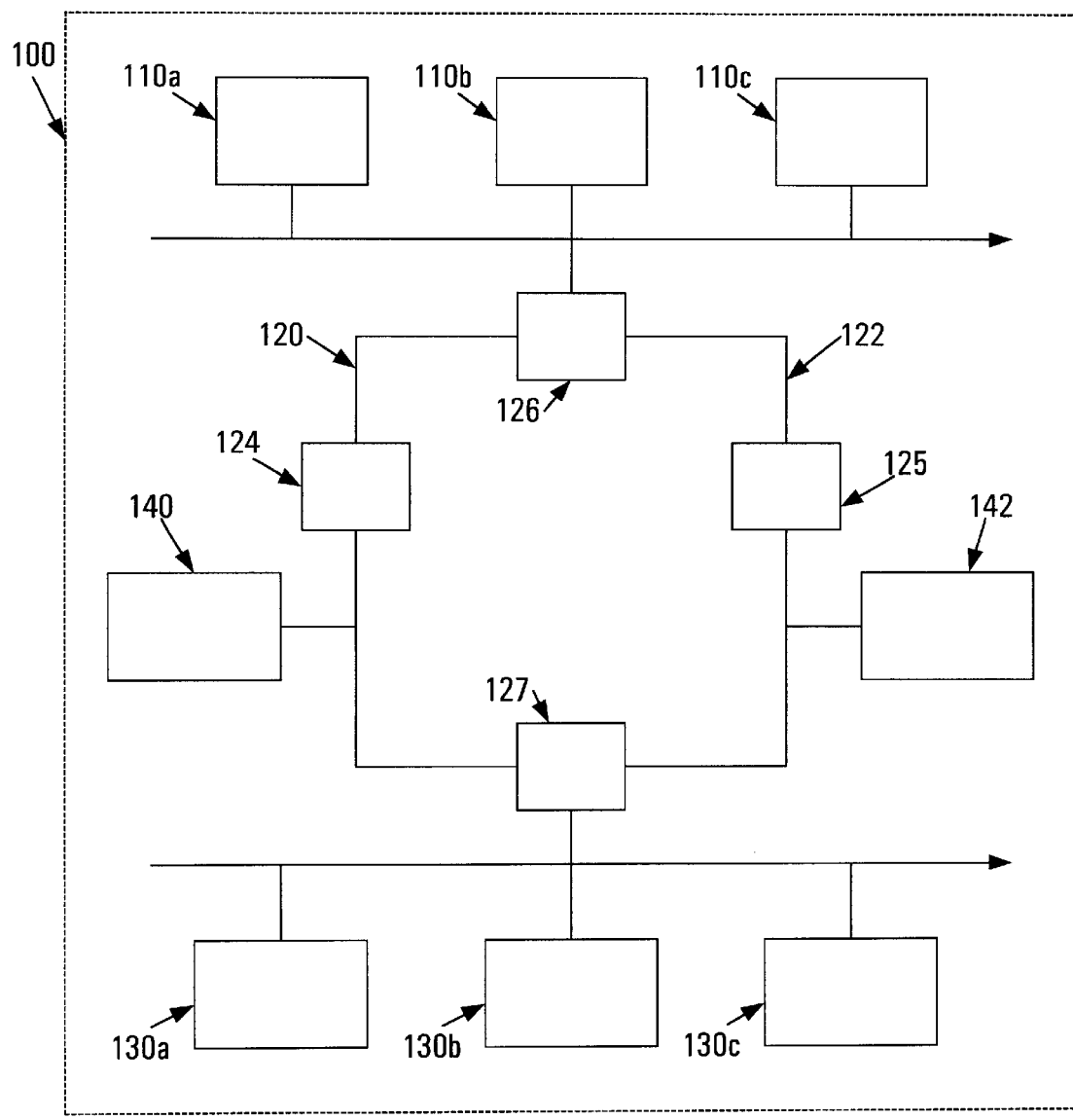
FIG. 1 is a block diagram of a computer system communication network in accordance with the prior art.
Figure 2:
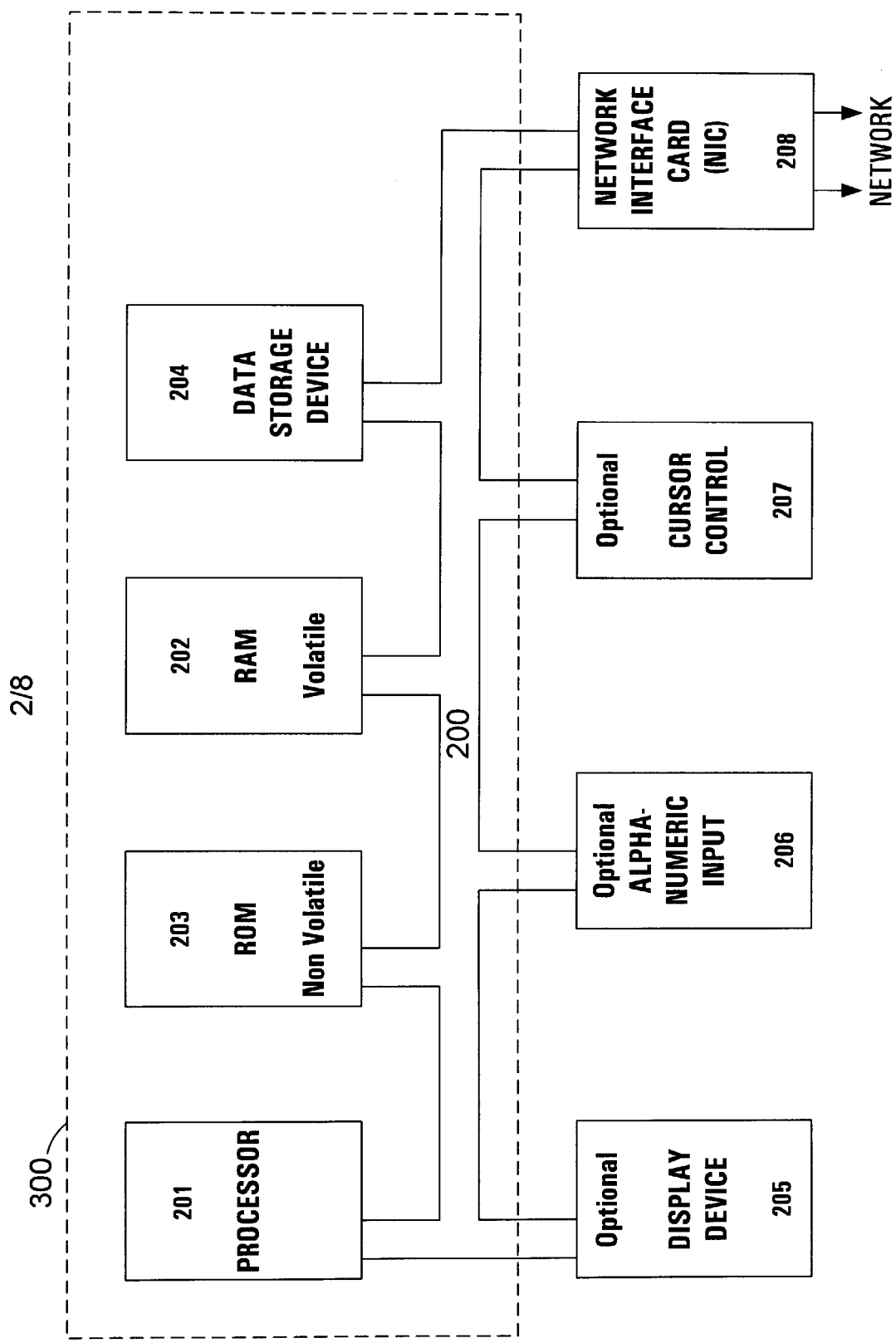
FIG. 2 shows a general purpose computer system upon which embodiments of the present invention may be practiced.

Refer to FIG. 2 which illustrates client computer system 300 (the following discussion is also pertinent to a server computer system). In general, client computer system 300 used by the embodiments of the present invention comprises a bus 200 for communicating information, a central processor 201 coupled with bus 200 for processing information and instructions, a random access memory 202 coupled with bus 200 for storing information and instructions for central processor 201, a read-only memory 203 coupled with bus 200 for storing static information and instructions for central processor 201, a data storage device 204 such as a magnetic or optical disk and disk drive coupled with bus 200 for storing information and instructions, a display device 205 coupled to bus 200 for displaying information to the computer user, an optional alphanumeric input device 206 including alphanumeric and function keys coupled to bus 200 for communicating information and command selections to central processor 201, an optional cursor control device 207 coupled to bus 200 for communicating user input information and command selections to central processor 201, and a network interface card (NIC) 208 coupled to bus 200 for communicating from a communication network to central processor 201.

Display device 205 of FIG. 2 utilized with client computer system 300 of the present invention may be a liquid crystal device, cathode ray tube, or other display device suitable for creating graphic images and alphanumeric characters recognizable to the user. Cursor control device 207 allows the computer user to dynamically signal the two-dimensional movement of a visible symbol (pointer) on a display screen of display device 205. Many implementations of the cursor control device are known in the art including a trackball, mouse, joystick or special keys on alphanumeric input device 206 capable of signaling movement of a given direction or manner of displacement. It is to be appreciated that the cursor means 207 also may be directed and/or activated via input from the keyboard using special keys and key sequence commands. Alternatively, the cursor may be directed and/or activated via input from a number of specially adapted cursor directing devices.

Figure 3:
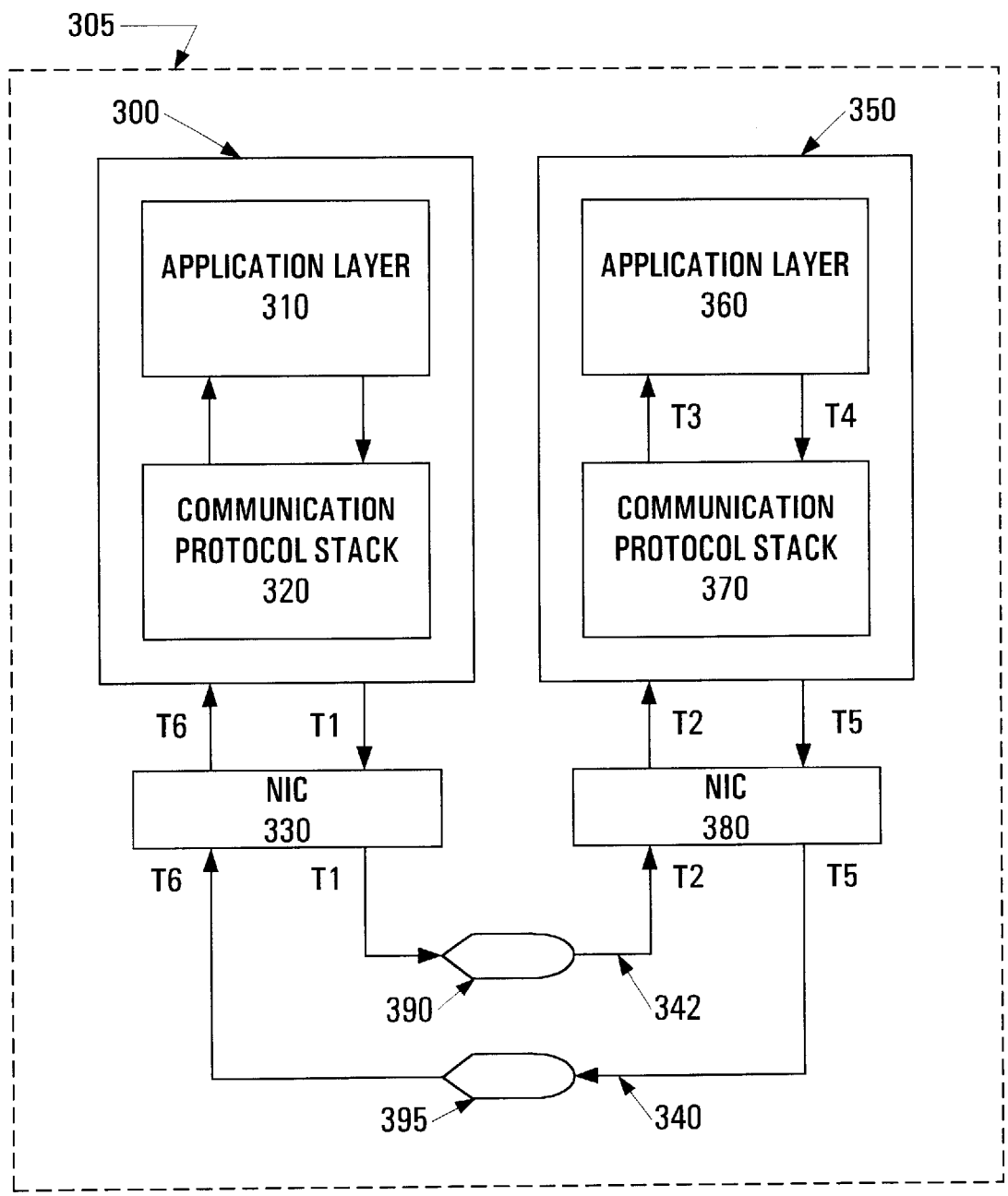
FIG. 3 is a diagram of an exemplary computer system communication network upon which the present invention may be practiced.

With reference now to FIG. 3, a diagram showing client computer system 300 coupled to server computer system 350 in communication network 305 is provided. In a typical communication network, there are a plurality of client computer systems and server computer systems coupled to each other with communications equipment. For the discussion herein, a single client computer system 300 is shown coupled via communications lines 340 and 342 with a single server computer system 350, but more computer systems could be employed. Client computer system 300 and server computer system 350 are each connected in communication network 305 by physical layer network interface cards (NICs) 330 and 380, respectively.

With reference still to FIG. 3, the software executed by central processor 201 (FIG. 2) of client computer system 300 is represented by application layer 310 which is separated from the remainder of protocol stack 320. Application layer 310 defines the manner in which application programs interact with the communication network, where applications include computer software programs, word processors, database management systems, electronic mail, and the like. Protocol stack 320 contains the remaining layers of software that define the computer-to-computer or computer-to-network protocol, where protocol defines the procedures to be followed when data are transmitted and received. In a similar manner, server computer system 350 includes analogous application-layer 360 and protocol stack 370.

With reference to FIG. 3, one of the software layers (e.g., application layer 310) of client computer system 300 transmits a request to server computer system 350 in the form of request data packet 390, and server computer system 350 responds to the request in the form of response data packet 395. In this example, request data packet 390 and response data packet 395 are shown traveling by different communications lines (e.g., in a switched network environment), but it is appreciated that in the present invention the data packets alternatively can travel over the same communications line.

The present invention is a client-implemented process that determines performance statistics associated with the request and response data packets sent and received by the client and server computer systems. The present invention uses filters to identify and select request and response data packets that will be used to generate performance statistics.

The present invention applies time-stamps to the identified request and response data packets. The present invention uses correlation rules to correlate a response packet to a request packet, so that the time-stamps can be used to determine time intervals associated with the time between transmission and reception of the data packets, by the computer systems. The present invention uses the time intervals to determine the performance statistics. In one embodiment, the present invention implements the above method in the form of extensions to a Remote Network Monitoring (RMON) management information base (MIB).

NETWORK PERFORMANCE STATISTICS— DEFINITIONS

Figure 4:
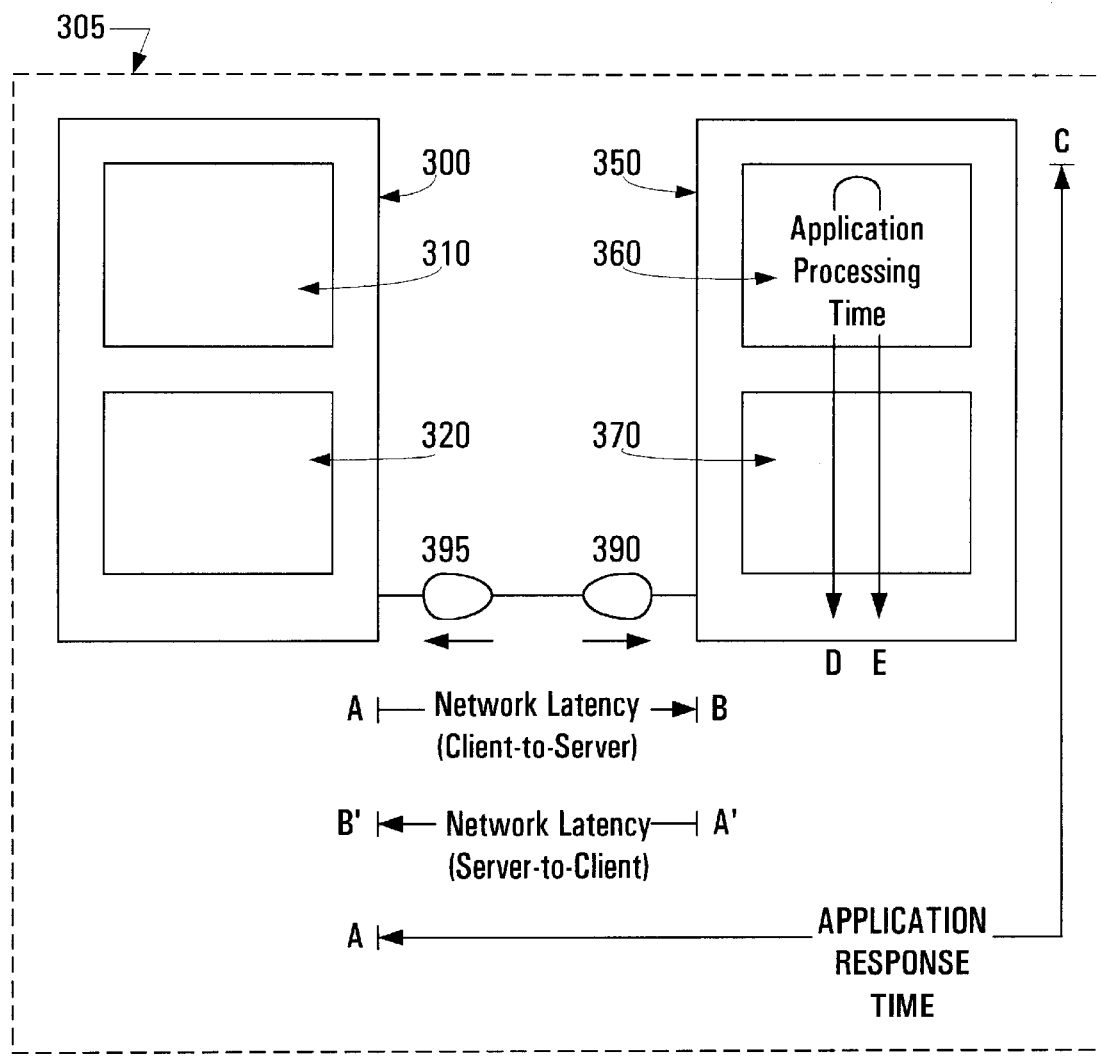
FIG. 4 is a diagram defining performance statistics for an exemplary computer system communication network upon which the present invention may be practiced.

With reference now to FIG. 4, client computer system 300 is coupled to server computer system 350 in communication network 305. A data packet takes a measurable amount of time to travel from client computer system 300 to server computer system 350, and vice versa. It also takes a measurable amount of time for a computer system to perform an application.

Continuing with reference to FIG. 4, the amount of time for a data. packet to travel from one computer system to another is referred to as "latency." "Network latency" is the amount of time required for the data packet to travel from point A, A' at which it exits one computer system to point B, B' at which it enters another computer system. With reference back to FIG. 3, network latency is the time to travel one-way from network interface card 330 in client computer system 300 to network interface card 380 in server computer system 350 and vice versa. The network latency from client computer system 300 to server computer system 350 is determined by computing the difference between time-stamps T2 and T1, and the network latency from server computer system 350 to client computer system 300 is determined by computing the time difference between time-stamps T6 and T5.

With reference to FIGS. 3 and 4, "application processing time" is the time required for server computer system 350 to complete performing an application in response to a request received from client computer system 300. Application processing time is the elapsed time between the time when request data packet 390 enters server computer system 350 and the time when the correlated response data packet 395 exits server computer system 350 (one-way from point D to point E). The application processing time is determined for correlated data packets by computing the difference between time-stamps T5 and T2.

With reference to FIGS. 3 and 4, "application response time" is the elapsed time between the time when request data packet 390 exits client computer system 300 and the time when response data packet 395 enters client computer system 300 (round trip from point A to point C), where response data packet 395 is sent in response to request data packet 390. Thus, application response time includes network latency from client computer system 300 to server computer system 350, application processing time in server computer system 350, and network latency from server computer system 350 to client computer system 300. The application response time is determined for correlated data packets by computing the difference between time-stamps T6 and T1.

NETWORK PERFORMANCE STATISTICS— OPERATION

Figure 5:
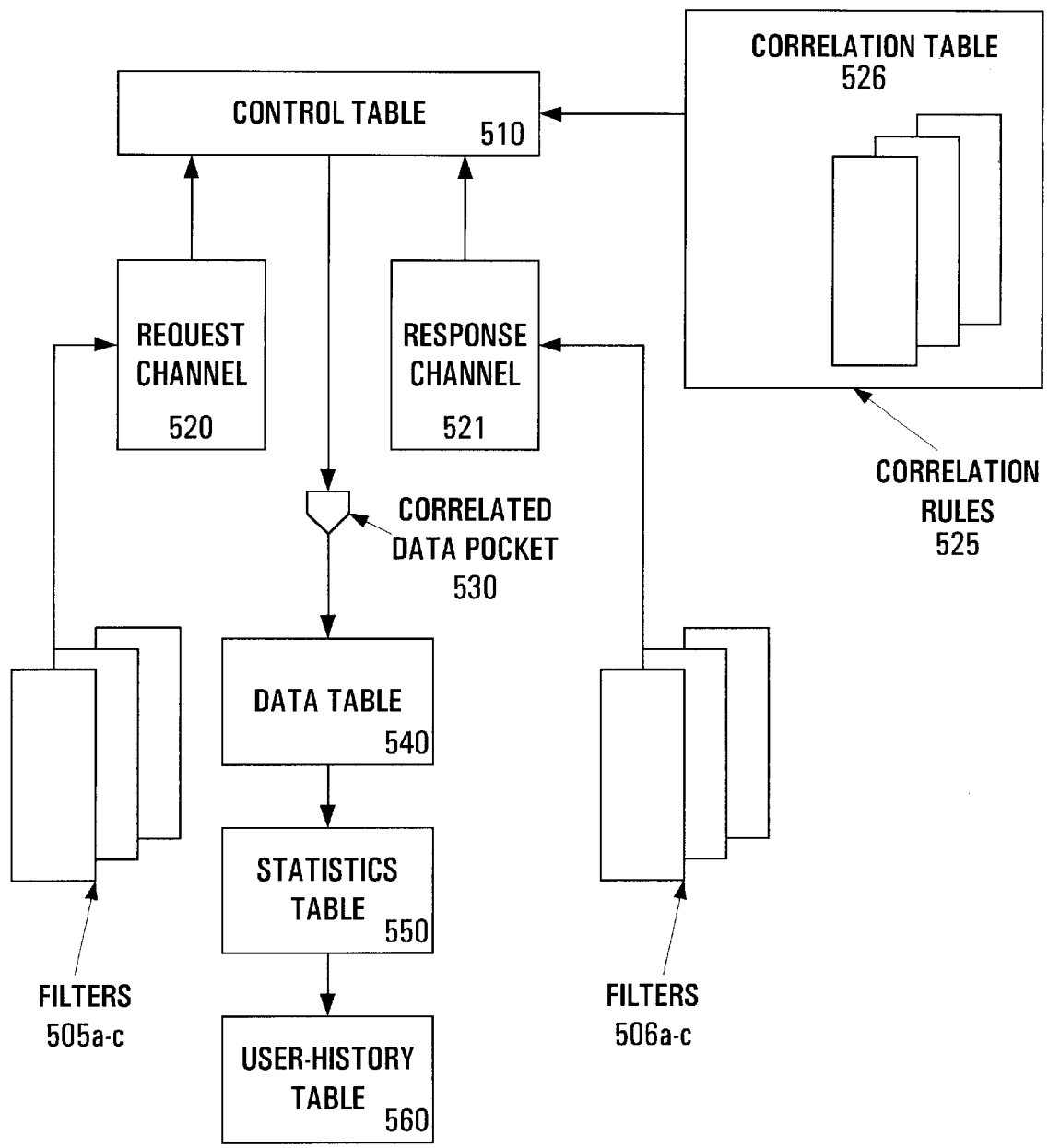
FIG. 5 is a diagram illustrating an arrangement of memory units in a computer system in accordance with one embodiment of the present invention.

Refer now to FIG. 5, which illustrates the memory structure of the present embodiment of the present invention within the computer-readable memory units of client computer system 300 and also in server computer system 350 of FIG. 3. In the present embodiment, filters 505*a*, 505*b* and 505*c* contain recognition characteristics for recognizing and selecting request data packets 390 that are of interest to the network manager (that is, the data packets that will be used to generate performance statistics). Similarly, filters 506*a*, 506*b* and 506*c* contain recognition characteristics for recognizing and selecting response data packets 395 that are of interest to the network manager. It is appreciated that for the discussion herein two sets of three filters each are shown; however, the number of filters applied in the present invention may be different from the number shown.

Continuing with reference to FIG. 5, request channel 520 stores request packets 390 selected by filters 505*a–c*. Similarly, response channel 521 stores response packets 395 selected by filters 506*a–c*. In the present embodiment, each filter 505*a–c* and 506*a–c* is uniquely indexed, and thus request channel 520 and response channel 521 each specify the filters to be applied to request and response data packets 390 and 395, respectively, by referencing the appropriate index. In a similar manner, in the present embodiment request channel 520 and response channel 521 are each uniquely indexed so that they can be referenced and acted on in accordance with the present invention.

With reference still to FIG. 5, in the present embodiment, correlation rules 525*a*, 525*b* and 525*c* to be applied to request channel 520 and response channel 521 are specified in correlation table 526. Although three correlation rules are shown in FIG. 5, it is appreciated that a different number of correlation rules may be applied in accordance with the present invention. In the present embodiment, each correlation rule 525*a–c* is uniquely indexed, and thus correlation table 526 specifies the correlation rules to be applied by reference to the appropriate index. In the present embodiment, correlation table 526 is identified by a unique index that associates the correlation table with control table 510.

Continuing with reference to FIG. 5, in the present embodiment, control table 510 references request channel 520 and response channel 521 using their unique indices. The present invention applies correlation rules 525*a–c* to request channel 520 and to response channel 521 to identify a match of a response data packet 395 to a request data packet 390, thereby forming a correlated request and response data packet 530. In the present embodiment, each request data packet 390 and response data packet 395 includes time-stamps corresponding to the time when it was transmitted and received by a computer system. For each correlated data packet 530, in the present embodiment, data table 540 is used to store entries consisting of the time difference between these time-stamps. In this embodiment, statistics table 550 is used to store performance statistics that are based on the information stored in data table 540. At a time interval specified by the network manager, the performance statistics in statistics table 550 are read to user-history table 560. In this embodiment, control table 510, correlation table 526, data table 540 and statistics table 550 are linked to each other through the use of an index common to each.

Figure 6:
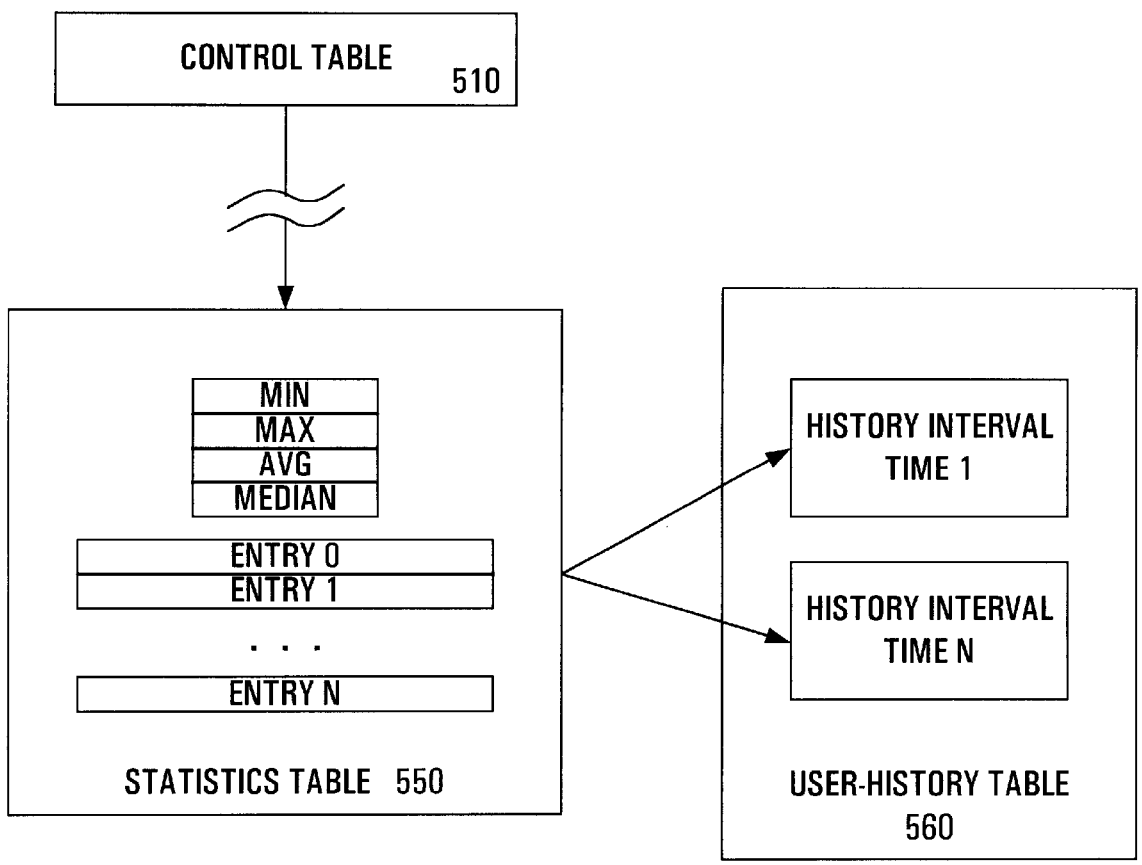
FIG. 6 is an illustration of a performance statistics data table in accordance with one embodiment of the present invention.

Refer now to FIG. 6 which shows statistics table 550. In the present embodiment, statistics table 550 accumulates the minimum, maximum, average and median for the entries stored in data table 540. The information stored in statistics table 550 is collected for a specified time interval, and then read to user-history table 560. In user-history table 560, data are stored for each of a plurality of time intervals. The data stored for each time interval may also be combined to compute data for a larger time interval.

Figure 7:
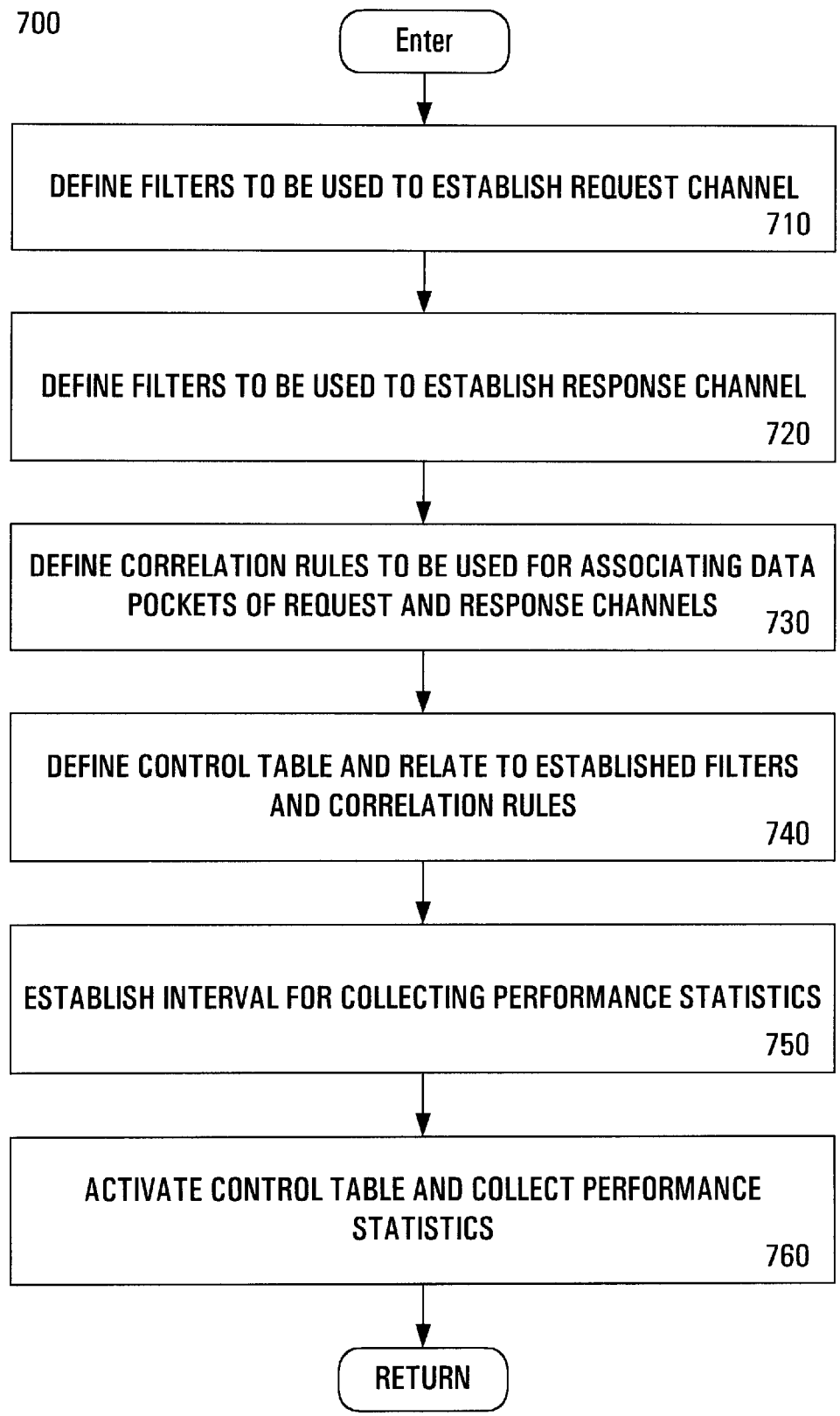
FIG. 7 is a flowchart of a process for defining a control table in accordance with one embodiment of the present invention.

FIG. 7 illustrates a process 700 for creating and activating a control table, where process 700 is implemented as program instructions stored in computer-readable memory units of client computer system 300 (FIG. 3) and executed by central processor 201 (FIG. 2), and also stored and executed on server computer system 350 (FIG. 3). In the present embodiment of the present invention, a set of filters, channels, and corresponding correlation rules for application to data packets are predefined and stored in the computer system. In another embodiment, in step 710 a filter or combination of filters is defined and created by the network manager for application to request data packets. Similarly, in step 720, a filter or combination of filters is defined and created for application to response data packets. Filters screen the data packets by comparing the bit/byte pattern of the data in certain defined fields of the data packets to the recognition characteristics specified by the filter definition. Filters are combined by the network manager using logical operations such as "and" and "or" to define more complex filters for screening data packets traveling over the communication network. Data packets are selected on the basis of a match (or alternatively, a failure to match) with the recognition characteristics of the filter or the combination of filters. Data packets that are identified and selected by the filter or combination of filters form a. channel. Thus, a channel accepts data packets that share recognition characteristics that are of interest to the network manager.

With reference still to steps 710 and 720 of FIG. 7, in the present embodiment of the present invention, the network manager uses an RMON MIB to specify a filter or a combination of filters (e.g., filters 505*a–c* of FIG. 5) to identify and capture request data packets. (The term "RMON" is used to mean both RMON and RMON2.) The request channel (e.g., request channel 520 of FIG. 5) contains request data packets that satisfy the filter(s) when the control table is activated by the network manager. Similarly, in the present embodiment of the present invention the network manager uses an RMON MIB to specify a filter or combination of filters (e.g., filters 506*a–c* of FIG. 5) to identify and capture response data packets. The response channel (e.g., response channel 521 of FIG. 5) contains response data packets that satisfy the filter(s). In the present embodiment, the filters are applied at the end-node computer systems. That is, in the present embodiment a filter is applied at either or both the client computer system and the server computer system, depending on the type of performance statistics that are being collected.

Depending on the type of information sought by the network manager regarding the performance of the communication network, the network manager may create more than one response channel and more than one request channel. Each response channel and request channel is indexed, and the index is used in the control table by the network manager to specify which response channel and which request channel are to be used as the basis for generating performance statistics.

With reference now to step 730 of FIG. 7, in one embodiment of the present invention, correlation rules (e.g., correlation rules 525 of FIG. 5) are specified based on the knowledge of protocol session behavior. For example, in a Transmission Control Protocol (TCP) session, one correlation matches the source Internet Protocol (IP) address in the request channel to the destination IP address in the response channel.

With reference back to FIG. 3, the central processors of client computer system 300 and server computer system 350 each incorporate an application layer and a protocol stack (note: in the International Standards Organization/Open System Interconnection [ISO/OSI] model, the, application layer is the top layer of the protocol stack, but for simplicity herein the application layer is separately identified from the remainder of the protocol stack). A user of client computer system 300 issues an application request in the form of request data packet 390 from application layer 310. Request data packet 390 thus initially contains data that identify the type of application being utilized or requested. As request data packet 390 passes through each layer of protocol stack 320, each layer adds bits and. bytes of information to request data packet 390 in a logical and standard format established by the ISO/OSI model. Therefore, when request data packet 390 exits the bottom of protocol stack 320, it contains a set of data (including source and destination addresses) that is logically organized and formatted in data fields according to a known standard. In a manner similar to the above, response data packet 395 also contains a set of data logically organized and formatted in data fields according to the same known standard.

By way of illustrating the above, each request and response data packet contains a destination address and a source address that are located within a specific field in each data packet. A correlation rule is defined to compare the destination and source addresses within request and response data packets as one method of establishing a correlation between request and response data packets. Other correlation rules are defined to compare other aspects of the request and response data packets until the correlation is complete, and the response data packet is matched to the request data packet that prompted the response.

With reference again to FIG. 3, client computer system 300 transmits numerous request data packets 390 to server computer system 350 and vice versa, and therefore the correlation rules defined in the present embodiment include a sophisticated set of recognition characteristics. The present invention defines correlation rules 525 (FIG. 5) that are of sufficient sophistication that a specific response data packet can be identified and matched with the specific request data packet to which the response data packet is responding. Correlation rules 525 that are to be applied to the request and response data packets of interest are defined in a correlation table (e.g., correlation table 526 of FIG. 5).

As discussed above, the present embodiment of the present invention incorporates correlation rules 525 to identify applications in data packets that are based on a known standard. The present embodiment also allows for correlation rules 525 to recognize and correlate data packets containing applications that potentially contain a protocol not generally used. For example, a business may use a unique application developed by that business and utilized solely on its internal communication network. The present embodiment incorporates correlation rules that can be designed to specifically identify those unique applications.

With reference back to FIG. 7, in step 740 of the present embodiment the network manager specifies a control table (e.g., control table 510 of FIG. 5). In the present embodiment, control table 510 is used by the network manager to specify the request and response channels and the correlation rules that will be used to collect performance statistics. In step 750 of the present embodiment, control table 510 is used by the network manager to specify the time interval over which the performance statistics are to be collected. In step 760, once control table 510 is complete, the network manager activates control table 510 to collect the desired performance statistics in accordance with the present invention.

Figure 8:
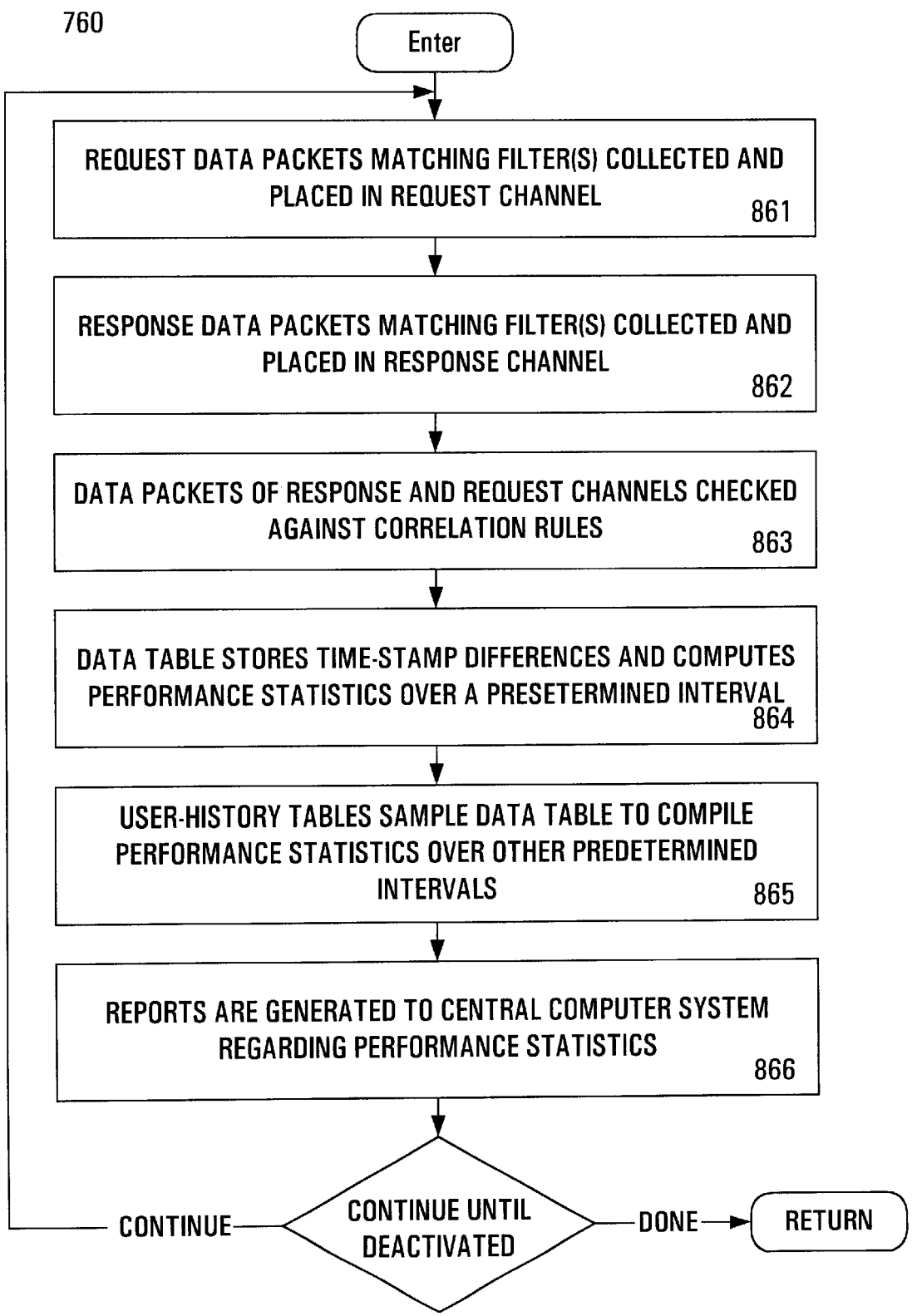
FIG. 8 is a flowchart of a process for compiling performance statistics in accordance with one embodiment of the present invention.

FIG. 8 provides details of step 760 (FIG. 7) that are implemented as program instructions stored in computer-readable memory units of client computer system 300 (FIG. 3) and executed by central processor 201 (FIG. 2), and also stored and executed on server computer system 350 (FIG. 3). In the present embodiment of the present invention, in steps 861 and 862 the filter or combination of filters is applied in order to select data packets sent by one or the other of the computer systems. In the present embodiment, with reference also to FIG. 3, in step 861 the filter(s) are applied to data packets transmitted by client. computer system 300. In step 862, in the present embodiment, the filter(s) are applied to data packets transmitted by server computer system 350. Thus, a filter is applied to each of the data packets, and the request data packets that satisfy the filter(s) are collected in a request channel, and the response data packets that satisfy the filter(s) are placed in a response channel. The accepted data packets will be used as the basis for generating performance statistics. In the present embodiment, the filters are applied at the end-node computer systems. That is, in the present embodiment a filter is applied at either or both the client computer system and the server computer system, depending on the type of performance statistics that are being collected.

With reference again to steps 861 and 862 of FIG. 8, in the present embodiment time-stamps are applied to the request and response data packets at the end-node computer systems; that is, time-stamps are applied at client computer system 300 and at server computer system 350. In step 861, request data packet 390 receives a time-stamp from client computer system 300 when it exits the client computer system, and a time-stamp from server computer system 350 when it enters the server computer system. In step 862, response data packet 395 receives a time-stamp from server computer system 350 when it exits the server computer system, and a time-stamp from client computer system 300 when it enters the client computer system. Thus, by using the end-node computer systems in the present invention, the time-stamps provide an accurate measure of when the data packets are transmitted and received by each of the computer systems in the computer network. With reference also to FIG. 3, in one embodiment the time-stamps are applied at the bottom of the protocol stacks of client computer system 300 and server computer system 350 (protocol stacks 320 and 370). In another embodiment, the time-stamps are applied at the network interface cards (NICs) of client computer system 300 and server computer system 350 (NICs 330 and 380).

With reference now to step 863 of FIG. 8, and also with reference to FIG. 3, the present embodiment of the present invention correlates response data packet 395 from server computer system 350 to request data packet 390 from client computer system 300; that is, the two data packets are identified, matched, and paired. In the present embodiment, request and response data packets 390 and 395 are correlated using a set of correlation rules 525 (FIG. 5) specified and applied to the request and response channels. In the present embodiment, the set of correlation rules to be applied are specified in control table 510 (FIG. 5) that also references the pertinent response and request channels. A request data packet 390 and response data packet 395 that each satisfy the same set of correlation rules are thus uniquely identified as matching (that is, a response data packet 395 is identified as the response to a request data packet 390 that requested the response) and are paired to form a correlated data packet 530 (FIG. 5).

With reference now to step 864 of FIG. 8, the present embodiment determines performance time based on the time-stamps of each pair of correlated data packets (e.g., correlated data packet 530 of FIG. 5). The present embodiment computes the time difference between the time-stamps that were applied to the request data packet that comprises one part of the correlated data packet and the time-stamps that were applied to the response data packet that comprises the other part of the correlated data packet. In one embodiment, with reference also to FIG. 3, the present invention computes the application response time using the time-stamps of each correlated data packet 530, by computing the difference between the time request data packet 390 was transmitted by client computer system 300 and the time that correlated response data packet 395 was received by client computer system 300. In one embodiment, the present invention computes the application processing time using the time-stamps of each correlated data packet 530, by computing the difference between the time request data packet 390 was received by server computer system 350 and the time correlated response data packet 395 was transmitted by server computer system 350. In one embodiment, the present invention calculates the network latency using the time-stamps applied to each data packet when it is sent by one computer system and received by the other computer system, by computing the difference between the time request data packet 390 was transmitted by client computer system 300 and received by server computer system 350, and by computing the difference between the time correlated response data packet 395 was transmitted by server computer system 350 and received by client computer system 300. As previously described above, the time-stamps provide an accurate measure of when the data packets are transmitted and received by the computer systems on the communication network. Thus, the use of the time-stamps to determine application response time, application processing time, and network latency provide an accurate measure of network performance and reliability.

With reference still to step 864 of FIG. 8, the present embodiment of the present invention calculates performance statistics based on the application response time, application processing time, and network latency for a plurality of correlated data packets 530 of FIG. 5, where the correlated data packets have each satisfied the correlation rules and hence represent transactions on the communication network of interest to the network manager for monitoring purposes. For example, correlated data packets that all pertain to a particular application may be used as the basis for calculating performance statistics associated with that application. The performance statistics include statistics such as the mean, median, minimum and maximum response times for a particular control table 510 (FIG. 5). In the present embodiment the performance statistics are automatically calculated and accumulated for a programmable interval of time specified by the network manager, e.g., for 30-minute intervals of time, although it is appreciated that other units of time can be specified in accordance with the present invention. The present embodiment then stores the performance statistics in a memory unit within a computer system that is on the communication network. In one embodiment, the performance statistics associated with a client computer system are stored in a memory unit within that client computer system.

With reference now to step 865 of FIG. 8, in the present embodiment the performance statistics for each consecutive 30-minute interval are then automatically used to calculate performance statistics for a programmable interval of time, e.g., for a 6-hour interval, by combining the performance statistics for each 30-minute interval. The performance statistics for each such interval are automatically used to determine performance statistics for a longer interval of time, e.g., for a 24-hour interval, by combining the performance statistics for each 6-hour interval. In this manner, the performance statistics are readily available to the network manager for either a shorter or a longer time interval. It is appreciated that other intervals of time can be specified in accordance with the present invention. Thus, the present embodiment of the present invention provides a method for readily and quickly detecting and identifying degradation of the network. The performance statistics also provide the information needed to enable the network manager to compare network performance against the metrics specified in the service level agreement. The performance statistics also permit the network manager to perform active troubleshooting to determine the source of any network degradation in addition to the monitoring function.

With reference now to step 866 of FIG. 8, in the present embodiment the performance statistics are reported to a central computer system. In one embodiment, the performance statistics are periodically and automatically reported to the central computer system from each client computer system on the communication network at a programmable interval of time, e.g., every 30 minutes, although it is appreciated that other intervals of time can be specified in accordance with the present invention.

With reference now to FIG. 3, it is appreciated that in the present embodiment, the round-trip network latency may also be readily determined using the protocol "heartbeat" data packets that are routinely generated in protocol stack 320 of client computer system 300 and transmitted to protocol stack 370 of server computer system 350, and vice versa. The purpose of such well-known heartbeat data packets is to enable the computer systems to determine that a communication link exists between the computer systems and to indicate if the link is broken. The heartbeat data packets do not pass into the application layer of the computer systems. Thus, round-trip network latency can be determined by using the time-stamps to time the round trip of the heartbeat data packet, because the time of the round trip does not include application processing time. In other words, round-trip network latency is the difference between time-stamps T6 and T1 when the difference between time-stamps T4 and T3 is zero.

In the present embodiment, the present invention uses an extension to an RMON MIB to implement the method and perform the steps described above in order to determine the performance statistics for the communication network system. As previously discussed, RMON is a supplement to the SNMP protocol currently employed in computer system communication networks, and thus the present embodiment of the present invention is compatible with the standards currently in use. In the present embodiment, the RMON MIB extension is comprised of a response time control table, a response time correlation table, a, response time data table, and a response time statistics database, which are specified in detail in the Code Section below, and which correspond to the method and functions of the control table, correlation table, data table, and statistics table described above for the present embodiment. In the present embodiment, the RMON MIB is implemented in the client and server computer systems and thus does not require additional hardware. Hence, the present embodiment of the present invention provides a cost-effective method for monitoring network performance. The present embodiment RMON MIB extension is provided in the Code Section below.

| Code Section - RMON MIB Extension in Accordance with the Present Invention |
|---|

Structure of MIB
    Response Time MIB assumes the availability of RMONv2 group. This MIB
    has the following structure.
        responseTime
            responseTimeCorrelationTable
                responseTimeCorrelationEntry
                    index of (responseTimeCorrelationControlIndex,
                          responseTimeControlIndex)

```
                responseTimeCorrelationControlIndex         Integer32,
                responseTimeCorrelationType                 Integer32,
                responseTimeCorrelationMatchMethod          Integer32,
                responseTimeCorrelationMatchByteCode        OctetString,
                responseTimeCorrelationProtcolDirLocalIndex Integer32,
                responseTimeCorrelationLength               Integer32,
                responseTimeCorrelationRequestOffset        Integer32,
                responseTimeCorrelationResponseOffset       Integer32,
                responseTimeCorrelationOwner                DisplayString,
                responseTimeCorrelationStatus               RowStatus
            responseTimeControlTable
                responseTimeControlEntry    index of (responseTimeControlIndex)
                    responseTimeControlIndex                Integer32,
                    responseTimeControlRequestChannelIndex  Integer32,
                    responseTimeControlResponseChanne;Index Integer32,
                    responseTimeControlInterval             Integer32,
                    responseTimeControlData                 Integer32,
                    responseTimeControlMaxEntries           Integer32,
                    responseTimeControlDescr                DisplayString,
                    responseTimeControlOwner                OwnerString,
                    responseTimeControlStatus               RowStatus
            responseTimeDataTable
                responseTimeDataEntry     index of (responseTimeTimeMark,
                            responseTimeControlIndex, responseTimeDataIndex)
                    responseTimeTimeMark                    TimeFilter,
                    responseTimeDataIndex                   Integer32,
                    responseTimeData                        Integer32
            responseTimeStats
                responseTimeStatsEntry    index of (responseTimeControlIndex)
                    responseTimeStatsAverage                Integer32,
                    responseTimeStatsMedian                 Integer32,
                    responseTimeStatsMaximum                Integer32,
                    responseTimeStatsMinimum                Integer32,
                    responseTimeStatsOverallMaximum         Integer32
            These objects are described in the MIB-Definition.
MIB-Definition
IMPORTS
    MODULE-IDENTITY, OBJECT-TYPE, Counter32, Integer32,
        Gauge32, TimeTicks, Counter64 FROM SNMPv2-SMI
    TEXTUAL-CONVENTION, RowStatus, DisplayString, TimeStamp
                                    FROM SNMPv2-TC
    MODULE-COMPLIANCE, OBJECT-GROUP FROM SNMPv2-CONF
    mib-2, ifIndex                  FROM RFC1213-MIB
    rmon, OwnerString, statistics, history, hosts, hostTopN, matrix,
    etherStatsEntry, etherHistoryEntry, hostEntry, hostTimeEntry,
    hostTopNEntry,
    hostTopNControlEntry, matrixSDEntry, matriXDSEntry, filter,
    channel, channelEntry, capture, captureBufferEntry
                                    FROM RMON-MIB
    responseTime, responseTimeStatsEntry, nlHost, nlHostEntry,
    nlMatrix, nlMatrixSDEntry, nlMatriXDSEntry,
    nlMatrixTopNControlEntry,
    nlMatrixTopNEntry,
    alHost, alHostEntry, alMatrix, alMatrixSDEntry,
    alMatrixTopNControlEntry, alMatrixTopNEntry, alMatriXDSEntry,
    usrHistory, usrHistoryEntry,
    rmonConformance, ZeroBasedCounter32
                                    FROM RMON2-MIB;
-- { rmon 1 } through { rmon 20 } are defined in RMON [RFC 1757] and
-- the Token Ring RMON MIB [RFC 1513] and the RMON2 MIB [RFC2021].
-- Object Identifiers
private             OBJECT IDENTIFIER ::= { internet 4 }
enterprises         OBJECT IDENTIFIER ::= { private 1 }
a3Com               OBJECT IDENTIFIER ::= { enterprises 43 }
generic             OBJECT IDENTIFIER ::= { a3Com 10 }
genExperimental     OBJECT IDENTIFIER ::= { generic 1 }
a3ComResponseTime   OBJECT IDENTIFIER ::= { genExperimental XX }
```

| -continued |
| --- |
| Code Section - RMON MIB Extension in Accordance with the Present Invention |

```
-- Response Time Groups
responseTime            OBJECT IDENTIFIER ::= { a3ComResponseTime 1 }
--
--    Response Time Group (responseTime)
--
--    Collects the response times in milli-seconds for the
--    different type of packets detected on a network segment.
--        Control Tables:
--                responseTimeCorrelationTable
--                responseTimeControlTable
--        Data Tables:
--                responseTimeDataTable
--                responseTimeStatsTable
--    responseTimeCorrelationTable
--    This table can be used to correlate ip-addresses, sequence numbers, etc.
responseTimeCorrelationTable OBJECT-TYPE
    SYNTAX          SEQUENCE OF ResponseTimeCorrelationEntry
    ACCESS          not-accessible
    STATUS          current
    DESCRIPTION
        "A running entry for each responseTimeCorrelationIndex is kept
        in this table after probe creates first entry in the
        responseTimeCorrelationTable."
::= { responseTime 1 }
responseTimeCorrelationEntry OBJECT-TYPE
    SYNTAX          ResponseTimeCorrelationEntry
    ACCESS          not-accessible
    STATUS          mandatory
    DESCRIPTION
        "A conceptual row in the responseTimeCorrelationTable.
        An example of the indexing of this entry is
        responseTimeCorrelationLength.1.5"
    INDEX { responseTimeCorrelationIndex, responseTimeCorrelationControlIndex
}
    ::= { responseTimeCorrelationTable 1 }
ResponseTimeCorrelationEntry ::= SEQUENCE {
    responseTimeCorrelationIndex              Integer32
        responseTimeCorrelationControlIndex       Integer32,
        responseTimeCorrelationType               Integer32,
        responseTimeCorrelationMatchMethod        Integer32,
        responseTimeCorrelationMatchByteCode      OctetString,
        responseTimeCorrelationProtcolDirLocalIndex  Integer32,
        responseTimeCorrelationLength             Integer32,
        responseTimeCorrelationRequestOffset      Integer32,
        responseTimeCorrelationResponseOffset     Integer32,
        responseTimeCorrelationOwner              OctetString,
        responseTimeCorrelationStatus             RowStatus
}
responseTimeCorrelationIndex OBJECT-TYPE
    SYNTAX       Integer32 (1..65535)
    MAX-ACCESS   not-accessible
    STATUS       current
    DESCRIPTION
        "A unique index for this ResponseTimeCorrelationEntry."
    ::= { ResponseTimeCorrelationEntry 1 }
responseTimeCorrelationControlIndex OBJECT-TYPE,
    SYNTAX          Integer32
    MAX-ACCESS      read-create
    STATUS          current
    DESCRIPTION
        "Response Time Control to which this correlation belongs."
    ::= { ResponseTimeCorrelationEntry 2 }
responseTimeCorrelationType                   OBJECT-TYPE,
    SYNTAX          Integer32
    MAX-ACCESS      read-create
    STATUS          current
    DESCRIPTION
        "Type of correlation. There has to be at least one match for
        each type of correlation for the response time."
    ::= { ResponseTimeCorrelationEntry 3 }
responseTimeCorrelationMatchMethod            OBJECT-TYPE,
    SYNTAX         INTEGER {
                        equal(0),
                    byteCode(1),
                    tcpSequence(2)
                        }
```

Code Section - RMON MIB Extension in Accordance with the Present Invention

```
    MAX-ACCESS    read-create
    STATUS        current.
    DESCRIPTION
        "The method to perform the match between request and
        response to calculate the response time between them.
        equal(0) matches the 'length' bytes in the request packet
        from the request-offset for the protocolDirLocalIndex
        to the 'length' bytes in the response packet at the
        response-offset for the protocolLocalIndex.
        So for example, to match source IP address of the request to
        the destination IP address in the response, protocolDirLocalIndex
        will be set to IP, length to 4 bytes and request offset to 12
        bytes in the IP header for request to response offset of 16 in
        the IP header for response.
        byteCode(1) use responseTimeCorrelationByteCode as the Java Virtual
        Machine (JVM) code to match the request to response with request
        and response packets (starting from protocolLocalIndex header) as
        parameters. JVM may or may not be supported by the probe.
        tcpSequence(2) uses the tcp sequence numbering (based on the length)
        to match request and response packet.
        Default is equal(0)"
    ::= { ResponseTimeCorrelationEntry 4}
responseTimeCorrelationByteCode              OBJECT-TYPE
    SYNTAX        OctetString
    MAX-ACCESS    read-create
    STATUS        current
    DESCRIPTION
        "Valid only if the responseTimeControlMatchMethod is 'byteCode'.
        This code is to be used as a function and run in the JVM with
        request and response packet as parameters."
    ::= { ResponseTimeCorrelationEntry 5 }
responseTimeCorrelationProtcolDirLocalIndex   OBJECT-TYPE,
    SYNTAX        Integer32
    MAX-ACCESS    read-create
    STATUS        current
    DESCRIPTION
        "Protocol from which to begin correlation."
    ::= { ResponseTimeCorrelationEntry 6 }
responseTimeCorrelationLength OBJECT-TYPE,
    SYNTAX        Integer32
    MAX-ACCESS    read-create
    STATUS        current
    DESCRIPTION
        "The length of the correlation."
    ::= { ResponseTimeCorrelationEntry 7 }
responseTimeCorrelationRequestOffset          OBJECT-TYPE,
    SYNTAX        Integer32
    MAX-ACCESS    read-create
    STATUS        current
    DESCRIPTION
        "The offset of correlation in the 'request' packet."
    ::= { ResponseTimeCorrelationEntry 8 }
responseTimeCorrelationResponseOffset         OBJECT-TYPE,
    SYNTAX        Integer32
    MAX-ACCESS    read-create
    STATUS        current
    DESCRIPTION
        "The offset of correlation in the 'response' packet."
    ::= { ResponseTimeCorrelationEntry 9 }
responseTimeCorrelationOwner OBJECT-TYPE
    SYNTAX        OwnerString
    MAX-ACCESS    read-create
    STATUS        current
    DESCRIPTION
        "The entity that configured this entry and is
        therefore using the resources assigned to it."
    ::= { ResponseTimeCorrelationEntry 10 }
responseTimeCorrelationStatus OBJECT-TYPE
    SYNTAX        RowStatus
    MAX-ACCESS    read-create
    STATUS        current
```

-continued

Code Section - RMON MIB Extension in Accordance with the Present Invention

```
    DESCRIPTION
        "The status of this row.
        An entry may not exist in the active state unless all
        objects in the entry have an appropriate value.
        If this object is not equal to active(1), this entry
        shall be deleted."
    ::= { ResponseTimeCorrelationEntry 11 }
responseTimeControlTable OBJECT-TYPE
    SYNTAX          SEQUENCE OF ResponseTimeControlEntry
    ACCESS          not-accessible
    STATUS          current
    DESCRIPTION
        "Controls the setup of response time table.
        Rationale:
        This table controls collection of response time
        for any user specified type of packet based on the
        filters defined through the channels specified here.
        This table can be used for network, protocol, application
        level response time monitoring."
::= { responseTime 2 }
responseTimeControlEntry OBJECT-TYPE
    SYNTAX          ResponseTimeControlEntry
    ACCESS          not-accessible
    STATUS          mandatory
    DESCRIPTION
        "A conceptual row in the responseTimeControlTable.
        An example of the indexing of this entry is
        responseTimeControlDescr.7"
    INDEX { responseTimeControlIndex }
    ::= {responseTimeControlTable 1 }
ResponseTimeControlEntry ::= SEQUENCE {
    responseTimeControlIndex                        Integer32,
        responseTimeControlRequestChannelIndex      Integer32,
        responseTimeControlResponseChannelIndex     Integer32,
        responseTimeControlInterval                 Integer32,
        responseTimeControlData                     Integer32,
        responseTimeControlDescr                    Integer32,
        responseTimeControlMaxEntries               Integer32,
    responseTimeControlOwner                        OwnerString,
    responseTimeControlStatus                       RowStatus
}
responseTimeControlIndex OBJECT-TYPE
    SYNTAX          Integer32 (1..65535)
    MAX-ACCESS      not-accessible
    STATUS          current
    DESCRIPTION
        "A unique index for this responseTimeControlEntry."
    ::= { responseTimeControlEntry 1 }
responseTimeControlRequestChannelIndex OBJECT-TYPE
    SYNTAX          Integer32
    MAX-ACCESS      read-create
    STATUS          current
    DESCRIPTION
        "The Channel Index of the request-side of the packet.
        This Channel Index must already be created in the
        channelTable with associated filters. The packet which
        get accepted by the channel is considered a response-time
        'request' packet for response time purpose."
    ::= { responseTimeControlEntry 2 }
responseTimeControlResponseChannelIndex OBJECT-TYPE
    SYNTAX          Integer32
    MAX-ACCESS      read-create
    STATUS          current
    DESCRIPTION
        "The Channel Index of the response-side of the packet.
        This Channel Index must already be created in the
        channelTable with associated filters. The packet which
        get accepted by the channel is considered a response-time
        'response' packet for response time purpose."
    ::= { responseTimeControlEntry 3 }
responseTimeControlInterval OBJECT-TYPE
    SYNTAX Integer32 (1..2147483647)
    MAX-ACCESS read-create
    STATUS current
    DESCRIPTION
        "The interval in seconds over which the data is
        sampled for the responseTimeStats Table."
```

Code Section - RMON MIB Extension in Accordance with the Present Invention

```
        DEFVAL { 1800 }
        ::= { responseTimeControlEntry 6 }
responseTimeControlData OBJECT-TYPE,
    SYNTAX INTEGER {
            on(1),
            off(2)
    }
    MAX-ACCESS    read-create
    STATUS        current
    DESCRIPTION
        "This object controls the flow of response time data
        through this control. If this object is on(1), data
        response-time data is collected. If this object is
        off(2), response-time data is not collected
        for this control."
    ::= { responseTimeControlEntry 7 }
responseTimeControlMaxEntries OBJECT-TYPE,
    SYNTAX        Integer32 (1..65535)
    MAX-ACCESS    read-create
    STATUS        current
    DESCRIPTION
        "The maximum number of entries to maintain in the
        responseTimeDataTable. After which older entries are deleted.
        Default maximum is 1000."
    ::= { responseTimeControlEntry 8 }
responseTimeControlDescr                         OBJECT-TYPE
    SYNTAX        DisplayString (SIZE(0..127))
    MAX-ACCESS    read-create
    STATUS        current
    DESCRIPTION
        "The description for the response time being calculated."
    ::= { responseTimeControlEntry 9 }
responseTimeControlOwner OBJECT-TYPE
    SYNTAX        OwnerString
    MAX-ACCESS    read-create
    STATUS        current
    DESCRIPTION
        "The entity that configured this entry and is
        therefore using the resources assigned to it."
    ::= { responseTimeControlEntry 10 }
responseTimeControlStatus OBJECT-TYPE
    SYNTAX        RowStatus
    MAX-ACCESS    read-create
    STATUS        current
    DESCRIPTION
        "The status of this row.
        An entry may not exist in the active state unless all
        objects in the entry have an appropriate value.
        If this object is not equal to active(1), all associated
        entries in the responseTimeStatsTable and
        responseTimeCorrelationTable shall be deleted."
    ::= { responseTimeControlEntry 11 }
-- Response Time data table (responseTimeDataTable)
responseTimeDataTable OBJECT-TYPE
    SYNTAX        SEQUENCE OF responseTimeDataEntry
    ACCESS        not-accessible
    STATUS        current
    DESCRIPTION
        "An entry is made in this table when probe finds a 'request'
        packet and a 'response' packet which are matched based on
        method specified in the control table."
::= { responseTime 3 }
responseTimeDataEntry OBJECT-TYPE
    SYNTAX        responseTimeDataEntry
    ACCESS        not-accessible
    STATUS        mandatory
    DESCRIPTION
        "A conceptual row in the responseTimeDataTable.
        An example of the indexing of this entry is
        responseTimeData.7.5678"
    INDEX { responseTimeTimeMark, responseTimeControlIndex }
    ::= { responseTimeDataTable 1 }
responseTimeDataEntry ::= SEQUENCE {
    responseTimeTimeMark   TimeFilter,
    responseTimeDataIndex  Integer32,
    responseTimeData       ZeroBasedCounter32,
}
```

-continued

Code Section - RMON MIB Extension in Accordance with the Present Invention

```
responseTimeTimeMark OBJECT-TYPE
    SYNTAX          TimeFilter
    MAX-ACCESS      not-accessible
    STATUS          current
    DESCRIPTION
        "A TimeFilter for this entry. See the TimeFilter textual
        convention to see how this works."
    ::= { responseTimeDataEntry 1 }
responseTimeDataIndex OBJECT-TYPE
    SYNTAX          Integer32
    MAX-ACCESS      read-only
    STATUS          current
    DESCRIPTION
        "Distinguishes this entry from other data entries"
    ::= { responseTimeDataEntry 2 }
responseTimeData OBJECT-TYPE
    SYNTAX          ZeroBasedCounter32
    MAX-ACCESS      read-only
    STATUS          current
    DESCRIPTION
        "The time in milli-second between the matched 'response'
        and 'request' packet. Maximum response time is limited
        by 32-bit maximum, otherwise 'request' is considered lost."
    ::= { responseTimeDataEntry 3 }
-- responseTimeStatsTable
responseTimeStatsTable OBJECT-TYPE
    SYNTAX          SEQUENCE OF ResponseTimeStatsEntry
    ACCESS          not-accessible
    STATUS          current
    DESCRIPTION
        "A running entry for each responseTimeControlIndex is kept
        in this table after probe creates first entry in the
        responseTimeDataTable."
::= { responseTime 4 }
responseTimeStatsEntry OBJECT-TYPE
    SYNTAX          ResponseTimeStatsEntry
    ACCESS          not-accessible
    STATUS          mandatory
    DESCRIPTION
        "A conceptual row in the responseTimeStatsTable.
        An example of the indexing of this entry is
        responseTimeStatsAverage.7"
    INDEX { responseTimeControlIndex }
    ::= { responseTimeStatsTable 1 }
ResponseTimeStatsEntry ::= SEQUENCE {
    responseTimeStatsAverage        Integer32,
    responseTimeStatsMedian         Integer32,
    responseTimeStatsMaximum        Integer32,
    responseTimeStatsMinimum        Integer32,
    responseTimeStatsOverallMaximum Integer32
}
responseTimeStatsAverage OBJECT-TYPE
    SYNTAX          Integer32
    MAX-ACCESS      read-only
    STATUS          current
    DESCRIPTION
        "The average time in milli-second for the entries
        created in the responseTimeDataTable per responseTimeControlIndex
        for the past duration of responseTimeControlInterval."
    ::= { responseTimeStatsEntry 1 }
responseTimeStatsMedian OBJECT-TYPE
    SYNTAX          Integer32
    MAX-ACCESS      read-only
    STATUS          current
    DESCRIPTION
        "The average time in milli-second for the entries
        created in the responseTimeDataTable per responseTimeControlIndex
        for the past duration of responseTimeControlInterval."
    ::= { responseTimeStatsEntry 2 }
responseTimeStatsMaximum OBJECT-TYPE
    SYNTAX          Integer32
    MAX-ACCESS      read-only
    STATUS          current
```

-continued

Code Section - RMON MIB Extension in Accordance with the Present Invention

```
    DESCRIPTION
        "The maximum time in milli-second for the entries
        created in the responseTimeDataTable per responseTimeControlIndex
        for the past duration of responseTimeControlInterval."
    ::= { responseTimeStatsEntry 3 }
responseTimeStatsMinimum OBJECT-TYPE
    SYNTAX        Integer32
    MAX-ACCESS    read-only
    STATUS        current
    DESCRIPTION
        "The average time in milli-second for the entries
        created in the responseTimeDataTable per responseTimeControlIndex
        for the past duration of responseTimeControlInterval."
    ::= { responseTimeStatsEntry 4 }
responseTimeStatsOverallMaximum OBJECT-TYPE
    SYNTAX        Integer32
    MAX-ACCESS    read-only
    STATUS        current
    DESCRIPTION
        "The maximum time in milli-second for the entries
        created in the responseTimeDataTable per responseTimeControlIndex
        for the duration of response time sampling."
    ::= { responseTimeStatsEntry 5 }
END
```

In summary, the present invention determines performance statistics associated with the request and response data packets sent and received by the client and server computer systems. The present invention uses filters to identify and select request and response data packets that will be used to generate performance statistics. The present invention applies time-stamps to the request and response data packets. The present invention uses correlation rules to correlate a response packet to a request packet, so that the time-stamps can be used to determine time intervals associated with the time between transmission and reception of the data packets by the computer systems. The present invention uses the time intervals to determine the performance statistics. In one embodiment, the present invention implements the above method in an extension to an RMON MIB.

In the manner described above, the present invention computes performance statistics for application. response time, application processing time, and network latency, and reports the performance statistics to the network manager at a prescribed interval. The present invention thus provides a method for monitoring a computer system communication network that readily and quickly detects and identifies degradation of the network. The present invention described herein measures performance time at the end-user computer systems and thus provides an accurate measure of the performance and reliability of the network. The performance statistics generated by the present invention can be used to measure the performance of the network against the provisions of a governing service level agreement. The present invention is implemented through the client and server computer systems, and thus is also cost-effective. The use of an RMON MIB extension means the present invention is compatible with the SNMP protocol currently employed in computer system communication networks.

The preferred embodiment of the present invention, application response time and network latency monitoring using RMON/RMON2-based extensions, is thus described. While the present invention has been described in particular embodiments, it should be appreciated that the present invention should not be construed as limited by such embodiments, but rather construed according to the following claims.

What is claimed is:

1. In a communication network comprising computer systems communicatively coupled to each other with communication equipment, a method for quantifying communication performance comprising the steps of:

a) a client computer system measuring performance statistics associated with data packets sent and received by said computer systems, said step a) comprising the steps of:

a1) applying a first time-stamp to data packets sent by a computer system over said communication equipment and applying a second time-stamp to data packets received by a computer system over said communication equipment;

a2) correlating a first data packet sent by a first computer system over said communication network to a second data packet sent by a second computer system over said communication network;

a3) computing a difference between said first time-stamp and said second time-stamp; and a4) calculating performance statistics measured on said difference and storing said performance statistics in a memory unit within said first computer system; and b) said client computer system reporting said stored performance statistics to a central computer system.

2. The method as recited in claim 1 wherein said step a) is implemented using a management information base extension to Remote Network Monitoring (RMON)-based computer software, said management information base extension comprising a response time control table, a response time correlation table, a response time data table, and a response time statistics database.

3. The method as recited in claim 1 wherein step a1) further comprises applying said first time-stamp and said second time-stamp at a network interface card of said client computer system.

4. The method as recited in claim 1 wherein step a1) further comprises applying said first time-stamp and said second time-stamp at a protocol stack of said client computer system.

5. The method as recited in claim 1 wherein said performance statistics measure application response time and wherein step a1) further comprises the steps of:

applying said first time-stamp to said first data packet when said first data packet is sent by said first computer system to said second computer system; and applying said second time-stamp to said second data packet when said second data packet is received by said first computer system from said second computer system, wherein said second data packet is an acknowledgment and sent in response to said first data packet, said first computer system being said client computer system and said second computer system being a server computer system.

6. The method as recited in claim 1 wherein said performance statistics measure application processing time and wherein step a1) further comprises the steps of:

applying said first time-stamp to said first data packet when said first data packet is received by said second computer system from said first computer system; and applying said second time-stamp to said second data packet when said second data packet is sent by said second computer system, wherein said second data packet is an acknowledgment and sent in response to said first data packet, said first computer system being said client computer system and said second computer being a server computer system.

7. The method as recited in claim 1 wherein said performance statistics measure network latency and wherein step a1) further comprises the steps of:

applying said first time-stamp to said first data packet when said first data packet is sent by said first computer system to said second computer system; and applying said second time-stamp to said first data packet when said first data packet is received by said second computer system, wherein said first computer system is said client computer system and said second computer system is a server computer system.

8. The method as recited in claim 1 wherein step a2) further comprises the steps of:

comparing said first data packet and said second data packet to correlation rules, said correlation rules defining matching characteristics for comparing said data packets; and pairing said first data packet and said second data packet when said correlation rules are satisfied.

9. The method as recited in claim 8 further comprising applying a filter for recognizing said data packets sent by and received by said computer systems, wherein said filter is comprised of recognition characteristics.

10. The method as recited in claim 8 wherein said correlation rules comprise matching of source and destination addresses of said first and second data packets.

11. In a communication network comprising computer systems communicatively coupled to each other with communication equipment, a method for quantifying communication performance comprising the steps of:

a) a server computer system measuring performance statistics associated with data packets sent and received by said computer systems, said step a) comprising the steps of:

a1) applying a first time-stamp to data packets sent by a computer system over said communication equipment and applying a second time-stamp to data packets received by said computer system over said communication equipment;

a2) correlating a first data packet sent by a first computer system over said communication network to a second data packet sent by a second computer system over said communication network;

a3) computing a difference between said first time-stamp and said second time-stamp; and a4) calculating performance statistics measured on said difference and storing said performance statistics in a memory unit within said server computer system; and b) said server computer system reporting said stored performance statistics to a central computer system.

12. The method as recited in claim 11 wherein said step a) is implemented using a management information base extension to Remote Network Monitoring (RMON)-based computer software, said management information base extension comprising a response time control table, a response time correlation table, a response time data table, and a response time statistics database.

13. The method as recited in claim 11 wherein step a1) further comprises applying said first time-stamp and said second time-stamp at a network interface card of said server computer system.

14. The method as recited in claim 11 wherein step a1) further comprises applying said first time-stamp and said second time-stamp at a protocol stack of said server computer system.

15. The method as recited in claim 11 wherein said performance statistics measure application response time and wherein step a1) further comprises the steps of:

applying said first time-stamp to said first data packet when said first data packet is sent by said first computer system to said second computer system; and applying said second time-stamp to said second data packet when said second data packet is received by said first computer system from said second computer system, wherein said second data packet is an acknowledgment and sent in response to said first data packet, said first computer system being a client computer system and said second computer system being said server computer system.

16. The method as recited in claim 11 wherein said performance statistics measure application processing time and wherein step a1) further comprises the steps of:

applying said first time-stamp to said first data packet when said first data packet is received by said second computer system from said first computer system; and applying said second time-stamp to said second data packet when said second data packet is sent by said second computer system, wherein said second data packet is an acknowledgment and sent in response to said first data packet, said first computer system being a client computer system and said second computer being said server computer system.

17. The method as recited in claim 11 wherein said performance statistics measure network latency and wherein step a1) further comprises the steps of:

applying said first time-stamp to said first data packet when said first data packet is sent by said first computer system to said second computer system; and applying said second time-stamp to said first data packet when said first data packet is received by said second computer system, wherein said first computer system is said server computer system and said second computer system is a client computer system.

18. The method as recited in claim 11 wherein step a2) further comprises the steps of:

comparing said first data packet and said second data packet to correlation rules, said correlation rules defining matching characteristics for comparing said data packets; and pairing said first data packet and said second data packet when said correlation rules are satisfied.

19. The method as recited in claim 18 further comprising applying a filter for recognizing said data packets sent by and received by said computer systems, wherein said filter is comprised of recognition characteristics.

20. The method as recited in claim 18 wherein said correlation rules comprise matching of source and destination addresses of said first and second data packets.

21. A computer system comprising:
   a processor coupled to a bus; and
   a memory unit coupled to said bus and having stored therein instructions that when executed by said processor implement a method for quantifying communication performance of a communication network comprising computer systems communicatively coupled to each other, said method comprising the steps of:
   a) measuring performance statistics associated with data packets sent and received by said computer systems, said step a) comprising the steps of:
      a1) time-stamping data packets sent by a computer system over said communication equipment and time-stamping data packets received by said computer system over said communication equipment;
      a2) correlating a first data packet sent by a first computer system on said communication network to a second data packet sent by a second computer system on said communication network;
      a3) computing a difference between a first time-stamp of said first data packet and a second time-stamp of said second data packet; and
      a4) calculating performance statistics measured on said difference and storing said performance statistics in a memory unit within said first computer system; and
   b) said first computer system reporting said stored performance statistics to a central computer system.

* * * * *